United States Patent [19]

Henwood et al.

[11] Patent Number: 5,109,350

[45] Date of Patent: Apr. 28, 1992

[54] EVALUATION SYSTEM

[75] Inventors: Kevin Henwood; David Marsh, both of Ipswich, England

[73] Assignee: British Telecommunications public limited company, London, England

[21] Appl. No.: 301,418

[22] Filed: Jan. 25, 1989

[30] Foreign Application Priority Data

Jan. 26, 1988 [GB] United Kingdom ............... 8801628

[51] Int. Cl.⁵ .......................................... G06F 11/34
[52] U.S. Cl. ................... 364/550; 395/575; 364/264; 364/264.3; 364/264.4
[58] Field of Search ............ 364/550, 551.01, 569, 364/200 MS File, 900 MS File, 143; 371/28, 62, 16.1, 17; 377/20

[56] References Cited

U.S. PATENT DOCUMENTS

| | | |
|---|---|---|
| 3,748,650 | 7/1973 | Garcia et al. |
| 4,369,493 | 1/1983 | Kronenberg ............ 364/200 |
| 4,677,580 | 6/1987 | Saluski ................. 364/569 |
| 4,720,806 | 1/1988 | Schippers et al. ....... 364/551.01 |
| 4,851,998 | 7/1989 | Hospodor .............. 364/569 |
| 4,872,121 | 10/1989 | Chan et al. ........... 364/551.01 |
| 4,905,171 | 2/1990 | Kiel et al. ............ 364/551.01 |
| 4,930,093 | 5/1990 | Houser et al. .......... 364/551.01 |

FOREIGN PATENT DOCUMENTS 0062978 10/1982 European Pat. Off.
WO86/06519 11/1986 PCT Int'l Appl.

OTHER PUBLICATIONS

A.F.I.P.S. Joint Computer Conference, vol. 44, May 1975, pp. 831–837, Afips Press, Montvale, GB; T. E. Bell et al: "A simple technique for controlled on-line system stimulation"—p. 831.

"Modelling Interactive Workloads of Time-sharing Computer Systems" by Vera Noethe—University of Edinburgh—Department of Computer Science, Oct. 1982—pp. 3-1 through 3-6—1 page of drawings.

Primary Examiner—Michael R. Fleming
Assistant Examiner—Debra A. Chun
Attorney, Agent, or Firm—Nixon & Vanderhye

[57] ABSTRACT

An evaluation system for computer performance resulting from user generated information at a remote workstation. The system 6 includes interfaces 8, 9 between the computer 5 and the workstation 14 and means 10 for recording user generated information and computer responses and times associated therewith. A processor 11 identifies known commands and responses to produce a user profile taking into account the user thinking time and typing rate or intercharacter times. The playback block 12 allows repeated reproduction of the original user's actions with the original delays including thinking times and intercharacter times associated therewith. During playback, the response times of the computer for commands and character echo times are measured and stored for analysis by block 13. Such analysis allow statistics for different system configurations or load conditions to be provided.

29 Claims, 11 Drawing Sheets

EVALUATION SYSTEM

The invention relates to an evaluation or load system for use with computer systems.

In computer systems which have one or more user terminals linked to a computer there is a need to evaluate performance under varying conditions.

In the past, attempts to provide an adequate picture of such systems operation have relied on simulation programs which emulate a possible set of operating conditions and produce a limited amount of operating results therefrom.

Such configurations can be very restricted in both flexibility and results obtained.

The present invention is concerned with providing a more realistic evaluation system with more detailed results.

According to the invention there is provided:

An evaluation system for computer performance responding to user generated information at a remote workstation, said system comprising:
  means for accessing user generated information and computer generated information;
  means for identifying specific information from that accessed indicative of a plurality of commands and the responses associated therewith from the computer;
  means for measuring time periods associated with generation of the commands and
  means for measuring the times associated with the computer responses.

Further according to the invention there is provided a method for evaluating computer performance in response to user generated information from a remote workstation said method comprising:
  accessing user generated information from the accessed information indicative of a plurality of commands and the responses associated therewith from the computer, measuring the time periods associated with the generation of the commands, and measuring the time periods associated with the computer responses.

The invention will now be described by way of example with reference to the accompanying drawings in which.

Figure 1:
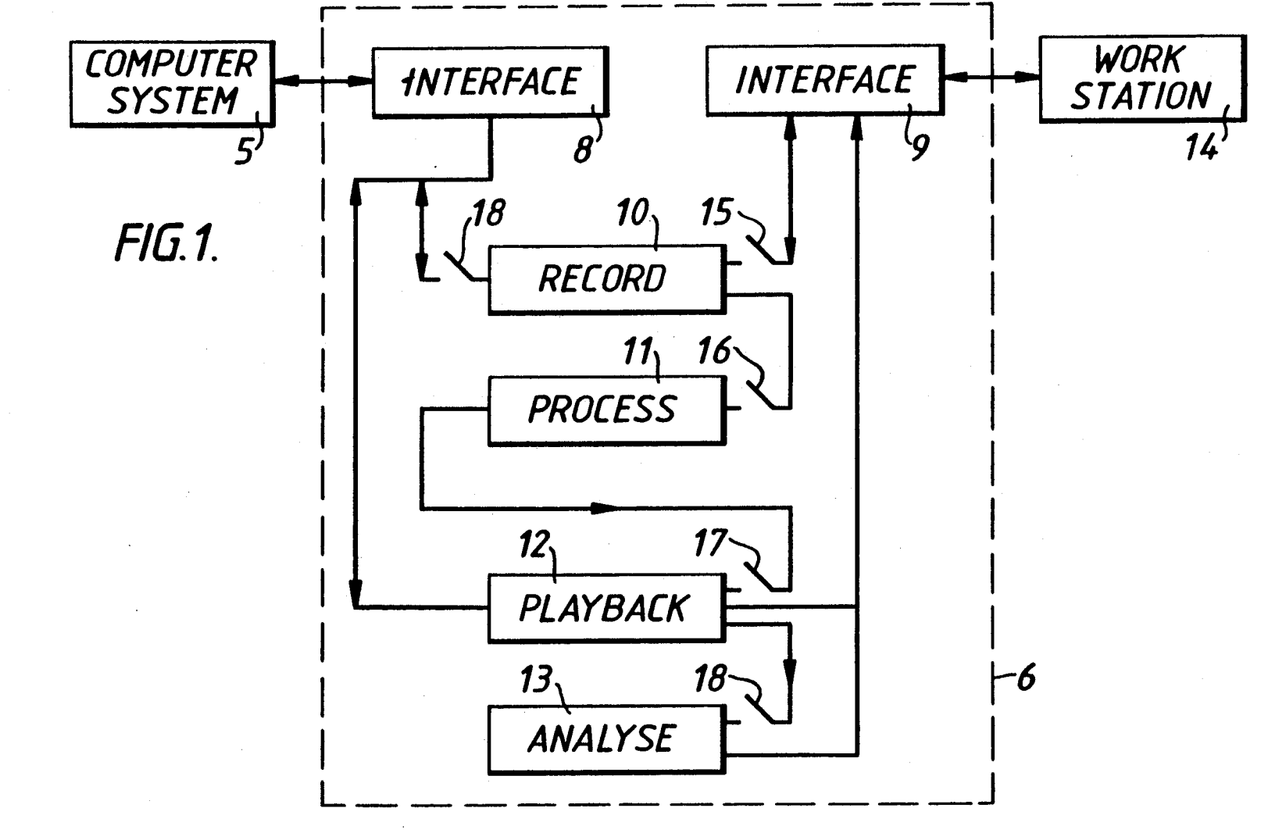
FIG. 1 shows one embodiment of the system of the invention connected between a computer and a workstation.

The FIG. 1 arrangement includes the evaluator or tester 6 connected to a computer 5 (eg a MicroVAX) and also connected to a user workstation 14 (e.g. a DEC.VT220 Terminal).

Any bi-directional communication between the computer 5 and the workstation 14 is via the tester 6. This is conveniently obtained by means of a RS 232 (9600 baud) link between them. Suitable interfacing in the computer 5 and workstation 14 will be matched by interfaces 8 and 9 in the tester 6. The tester includes a recording block 10, processing block 11, playback block 12 and analysis block 13. The various blocks can be selected via switches 15-18, typically semiconductor switches.

The recorder block 10 is provided to allow information passing from the workstation 14, in response to user keyboard operations to be recorded and the computer 5 responses thereto also being recorded.

By making the tester 6 a physical part of the link between the terminal and computer system, this has the ability to record all data passing in both directions. The load tester will have an inherent fixed delay in passing on information, typically 1 msec.

The recorder block is configured to record not only user generated information (eg commands) and the response information but the times taken to respond to this information as well as operator response times themselves (i.e. user thinking times).

The processor block 11 takes the recorded data and identifies known commands and responses to produce information characterising the users actions such as typing speed and think time for example, this information being considered as the 'user profile'.

This processed information is available to allow reproduction of the actions of the user without further input from the user him/herself.

The playback block 12 takes this processed information and reproduces exactly the original user actions with the delays (e.g. think times) originally encountered. This allows the computer 5 to be tested as if it was actually receiving user commands directly. The response times of the system for commands and character echo times for individual characters during playback are measured and stored for later analysis as required.

The analysis block 13 can take a number of the results obtained to produce statistics on one or more commands e.g. min/max/mean/variance. This allows analysis of different systems or load conditions to be provided.

Thus for example a directory command (DIR) will be analysed in detail for user think times and/or system response times.

One way in which the described configuration can achieve these actions is considered in more detail with respect to FIGS. 2-6.

Figure 2:
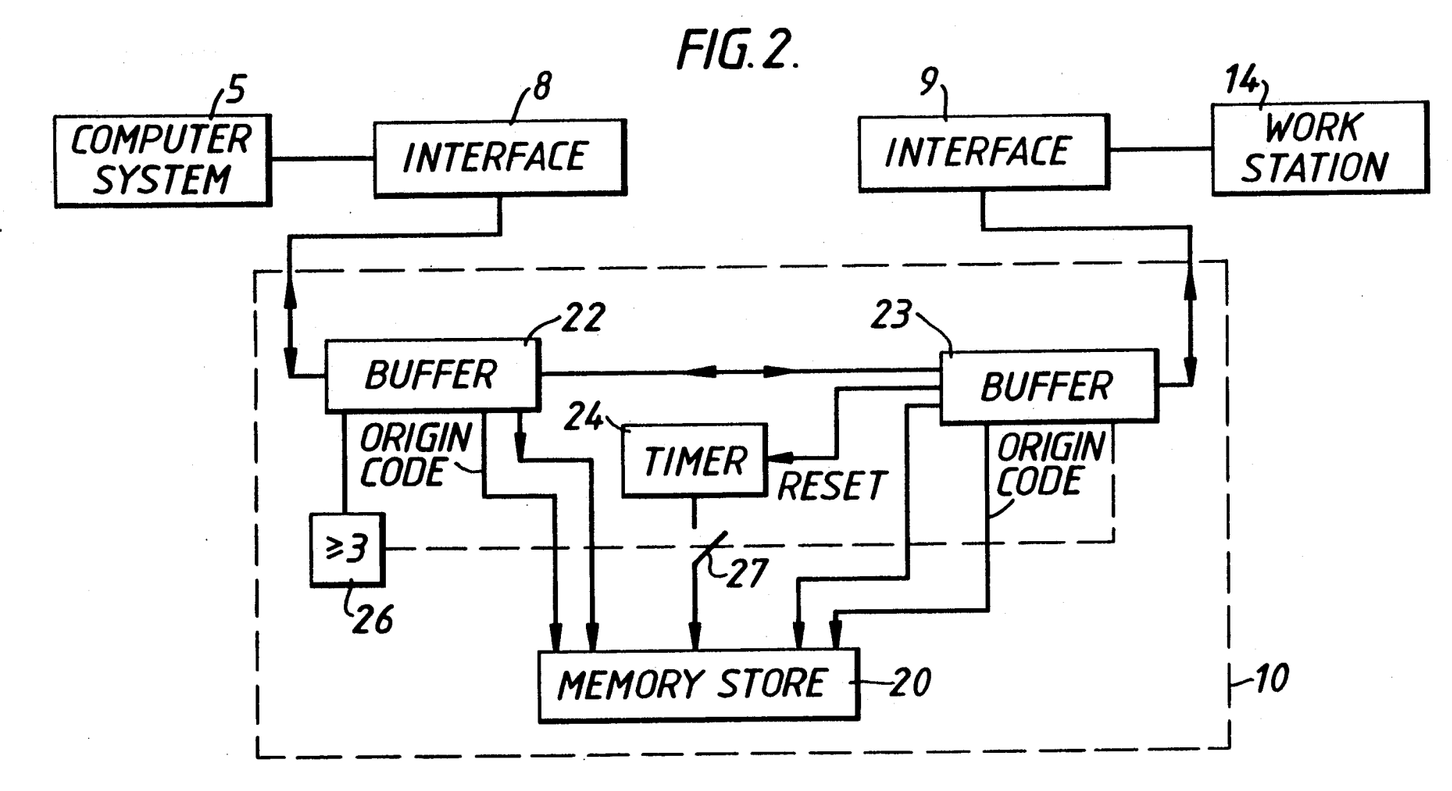
FIG. 2 shows the recording stage of FIG. 1 in more detail.

The recording stage 10 includes buffers 22, 23 for receiving information to and from the interfaces 8, 9. The recording stage buffers allow passage of information to pass between themselves and to the recording memory store 20. Each buffer will also generate a code to accompany the information to be stored indicative that it came from the computer 5 or workstation 14. A timer 24 will provide time information to accompany the workstation information so as to operate as a real-time clock to give the actual times that the stored information was generated.

A detector block 26 (e.g. counter/register) detects if 3 or more characters have been received (indicative of command response information) and actuates switch 27 to allow time information to be stored with this information from the computer. Buffer 23 also activates switch 27, each time a character is received from interface 9, to allow the character and time information to be stored together. The same buffer 23, also resets the real-time clock after activation of switch 27, as described.

In this way the record system will be employed to capture 1 or more hours of operations between the user and the computer system 5. Timing information is also stored and after recording, information on this stage can be made available for hard copy to a printer or passed to the workstation display for example.

Thus taking the DIR or directory command the displayed results can be as follows:

```
     USER    : d <3.51>
     SYSTEM  : d
     USER    : i <0.38> r <0.11>
     SYSTEM  : ir
     USER    :
               <2.53>
     SYSTEM  :
DIRECTORY
     Total of 2 files
     $ <1.04>
     USER    : L <5.14>
     SYSTEM  : L
     USER    : O <0.05>
```

Thus the information is identified as coming from the USER or the SYSTEM, i.e. the computer system.

The times following the letters indicate the times taken to generate the command letters. Hence 3.51 seconds is the user time taken to key in 'd' and in practice this will be identified later as the user 'think' times.

The SYSTEM echoes the received 'd' back to the workstation to acknowledge receipt. This time for echoing is not recorded at this stage as it will be of more interest at the playback stage. The block 26 of FIG. 2 allows information of less than 4 characters to be ignored for timing, if they come from the Computer System.

The next line displayed indicates that 'i' and 'r' were typed in quick succession (0.38 and 0.11 seconds respectively) and before the SYSTEM had time to echo back the characters individually, hence the 'ir' echo on the next line.

The blank USER line with the 2.53 seconds shown on the next line indicates a CR (carriage return) being sent by the user. The SYSTEM responds with the file listing shown.

The $ line shows the time taken between the user typing CR and the receipt from the SYSTEM of the last character of the response (i.e. the directory listing in this case).

Thereafter the user pauses for 5.14 seconds before typing the 'L' of LO (log-off). The SYSTEM responds with the echo and the user takes 0.05 seconds to type in the 'O' of LO. The SYSTEM echoes.

Hence the system provides details of the commands and resultant display and intercharacter times (i.e. times between 'i' and 'r' for example), the system response times, and the user think times.

The recorded information can be further processed by processing block 11 of FIG. 1 before replay. The processor (see FIG. 3) takes the information from memory 20 of record block 10.

Figure 3:
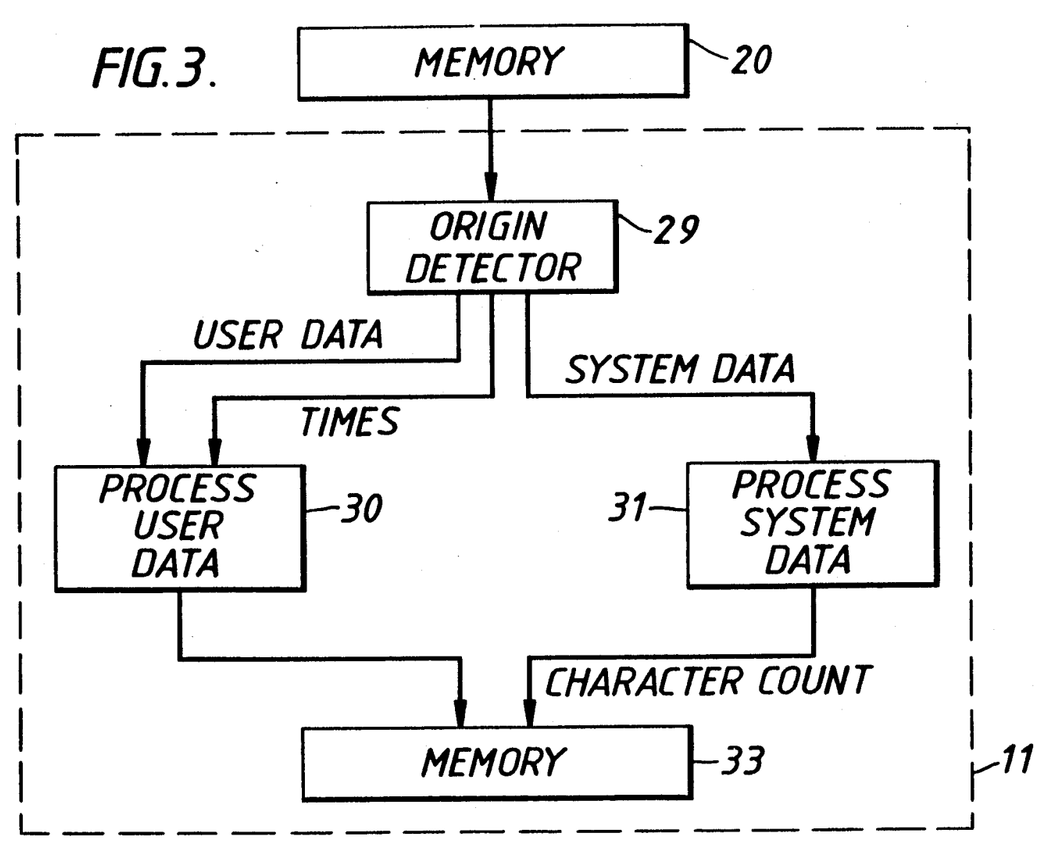
FIG. 3 shows the processing stage of FIG. 1 in more detail.

The detector 29 detects whether information from memory 20 is from the USER or the SYSTEM according to the stored identity code accompanying the data and this detector causes the passage of data to pass either to the user data processor block 30 or SYSTEM processor block 31 dependent on origin.

The processor block 31 will look at the SYSTEM information and count the response characters and this character count will pass for storage in memory block 33.

The user data taken from memory 20 is processed by blocks 30 and 31 to identify known commands and responses to produce the 'user profile'. This will allow the users actions to be accurately reproduced at the playback stage.

Figure 4:
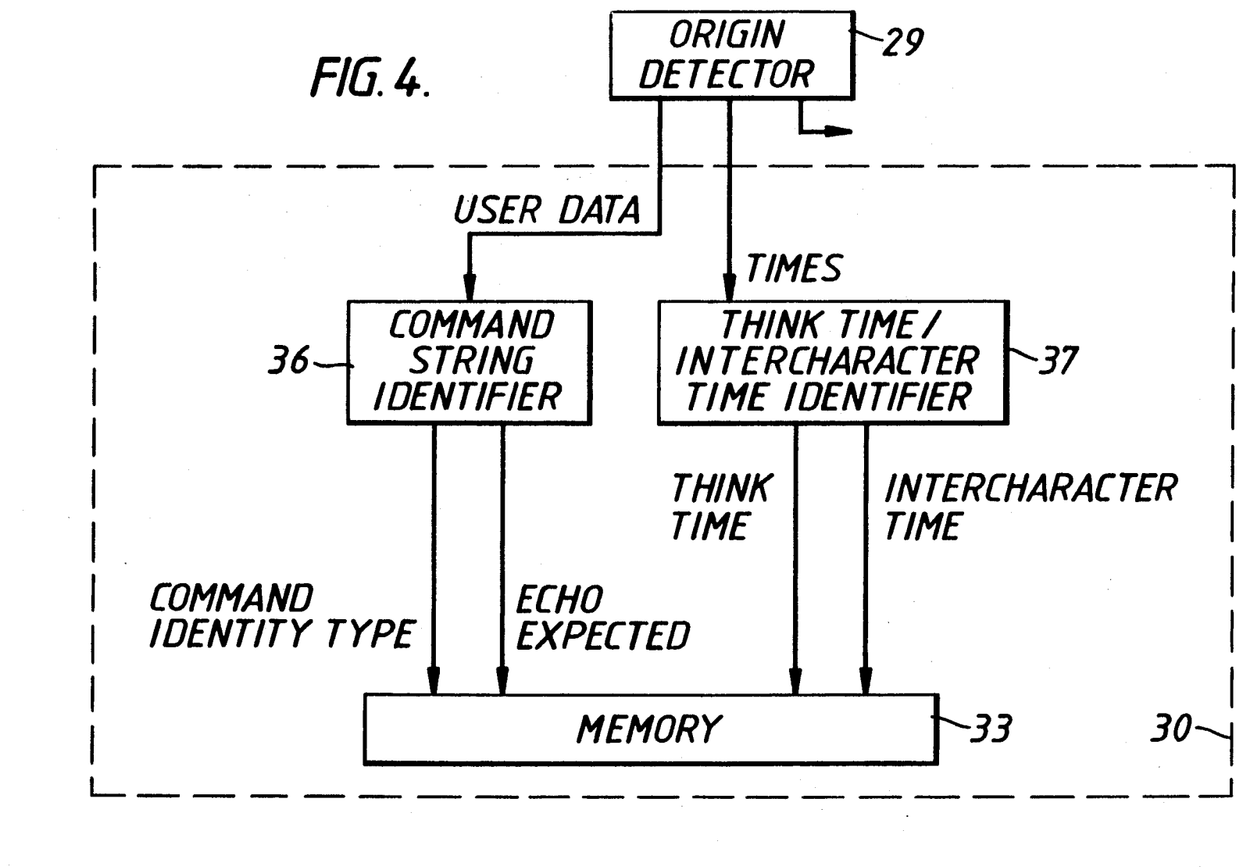
FIG. 4 shows the user data processor of FIG. 3 in more detail.

The user data processor block 30 is seen in more detail from FIG. 4 which shows the user information relating to characters and time arriving at identifier blocks 36 and 37 respectively. Identifier block 36 will identify command strings and pass its identity to memory 33 together with a code indicative of whether an echo is expected for each individual character identified. The identifier block 37 will identify whether the time information relates to user think time or intercharacter time and passes this information to the memory 33. This information is utilised to form the user profile.

The user profile on the DIR command previously exampled available for use on playback would be displayable in the form shown below.

```
     d<3.51> i <0.38> r <0.11>
     <CR> <2.53>
     COMMAND : directory command
     SYSTEM RESPONSE (chars): 104
     USER RESPONSE (secs): 5.14
```

Hence the user think time before 'd' is 3.51 secs and 0.38 and 0.11 respectively to enter 'i' and 'r'. The next line shows the command type. The next line shows the SYSTEM response of 104 characters (for directory name and details).

The last line shows the think time before users next action (i.e. user thinking time). In this case 5.14 secs before typing the LO (log-off) command.

All this information is stored within memory 33 to allow the system to reproduce the original user operational profile whenever required.

Figure 5:
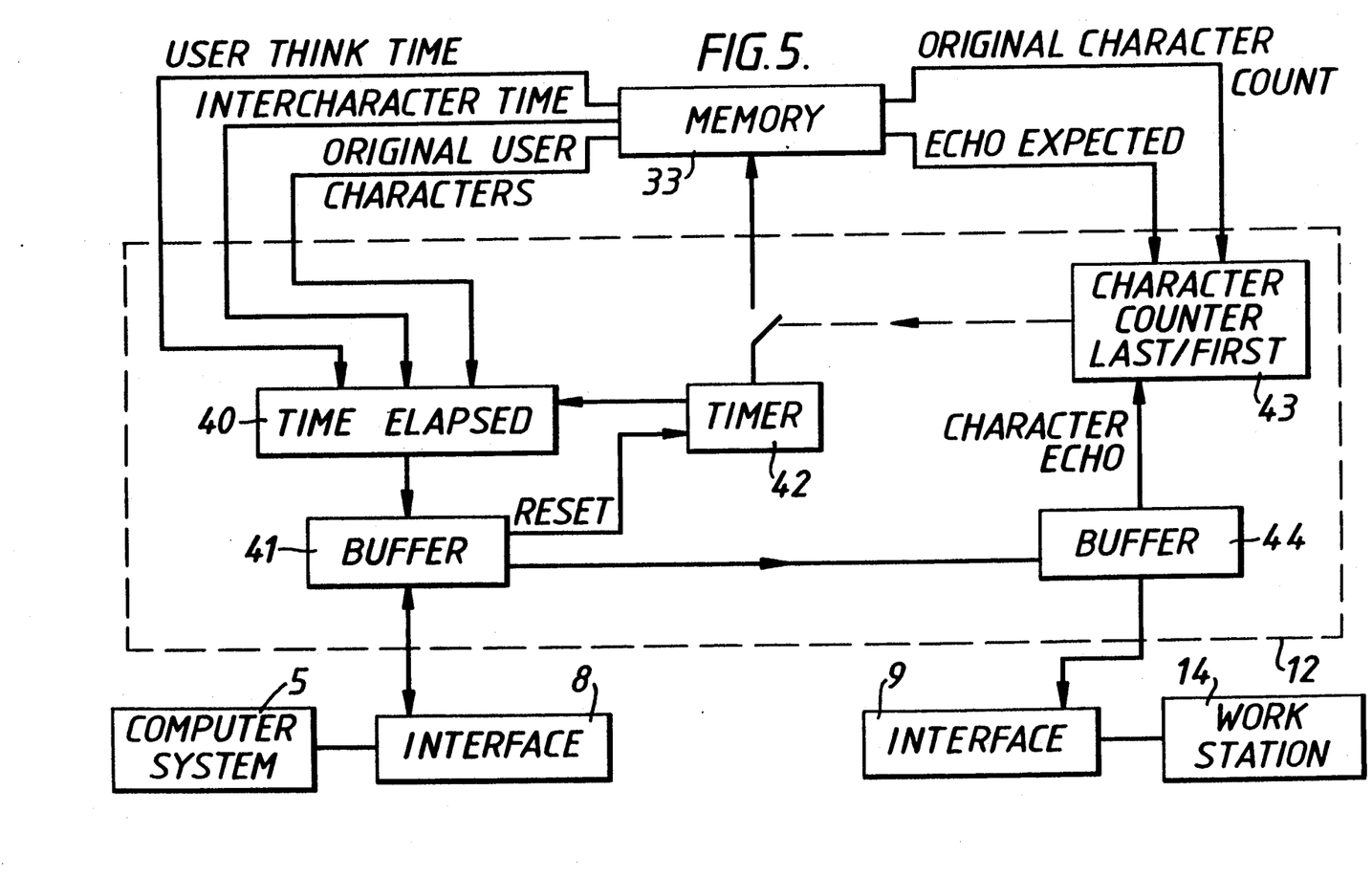
FIG. 5 shows the playback stage of FIG. 1 in more detail.

FIG. 5 shows the playback system used. The playback block 12 makes use of the processed information stored in memory 33 viz, user think time; intercharacter time; original user characters; echo expected; and original character count.

The time elapsed block 40 takes the user think time, intercharacter time and the original user characters and the characters pass to buffer 41 for sending to the interface 8 at times dictated by the think time or intercharacter times provided. Any characters received at buffer 41 are passed to buffer 44 for passage to the workstation. The timer 42 will provide comparison time information to ensure that block 40 produces the user information at correct intervals.

The memory 33 will also provide information on the original character count and whether an echo is expected and this information is passed to counter 43 which will count the last and first character echoes from the computer SYSTEM occurring as a result of playback and the new timing information thereon is passed for storage in memory 33 from timer 42 under the control of character counter 43.

In this way the reproduced actions of the recorded user profiles allows on playback a 'response profile' to be generated which measures response times of the system on playback for commands and character echo times for individual characters.

This can be in the form shown below.

--- d <0.11> i <0.05> r <0.05>
<CR> <0.22>
Number of response characters o.k.
COMMAND: directory command
SYSTEM RESPONSE (chars): 104
FIRST CHAR RESPONSE TIME: <0.11>
LAST CHAR RESPONSE TIME: <0.29>

---

So the 'dir' command is sent to the system under test during the playback. The character echo time from the VAX for 'd' is 0.11 seconds. The echo times for 'i' and 'r' are 0.05 seconds each.

A total of 104 characters are provided and first and last character response times are shown at the end. The number of response characters is correct as they correspond to the number originally recorded.

Figure 6:
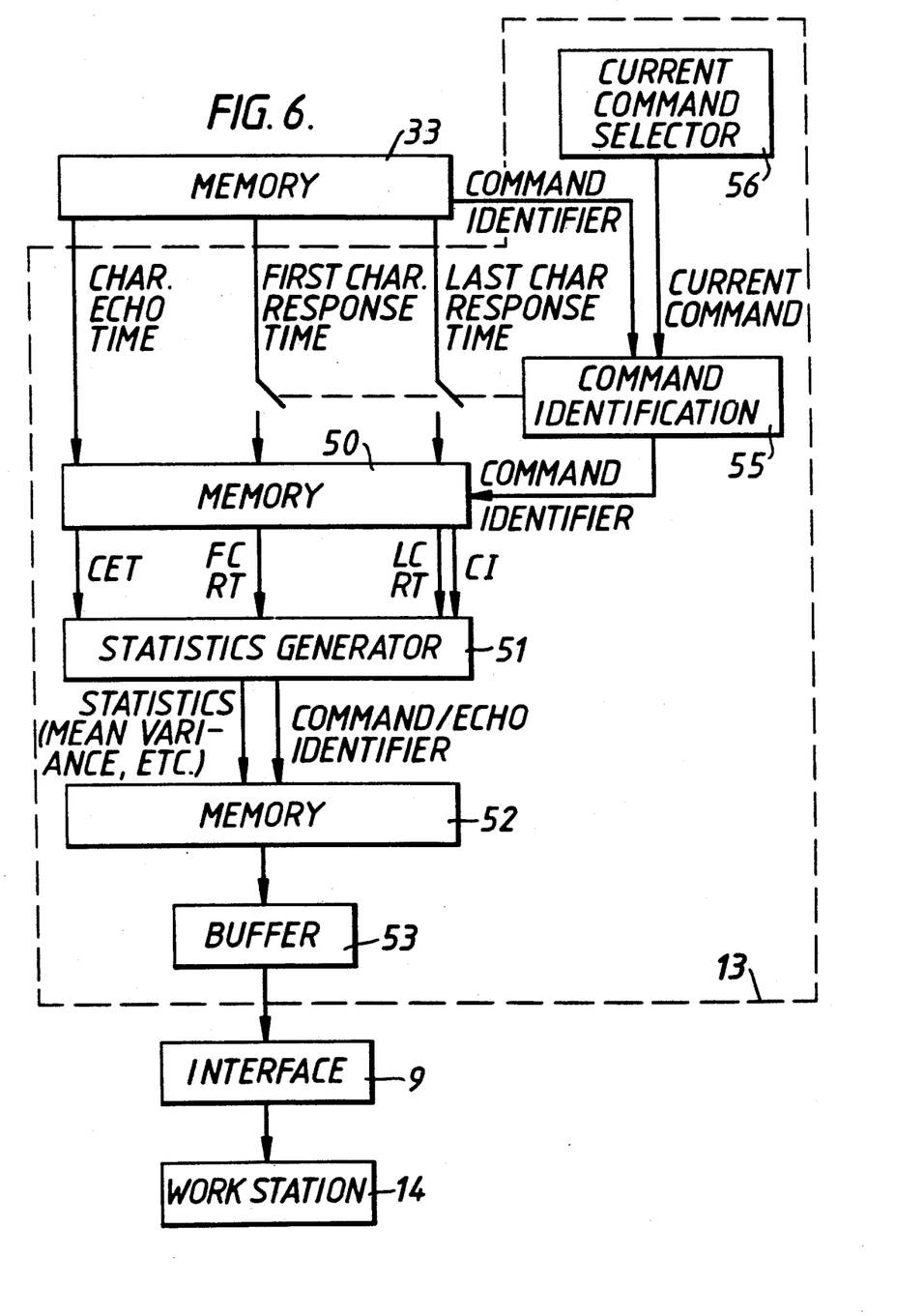
FIG. 6 shows the analysis stage of FIG. 1 in more detail.

This information is available for further analysis as required using the configuration shown in FIG. 6.

The desired analysis will allow collation of response times to various commands possible with the system. Thus individual command types can be identified and the timing information relating to them grouped together to give statistical information. In FIG. 6 the stored information in memory 33 is made available to a further memory 50 in the form of character echo time and first and last character response times. A command identifier block 55 receives stored command identification information from memory 33 to selectively switch the first and last character times to the memory associated with that specific command. There will be a large number of possible commands (e.g. 250) and the selector 56 will control the command identified by block 55. This selector 56 will typically step through all the commands possible, to deal with all commands stored in memory 33. Thus the memory 50 will contain storage areas each associated with specific commands and each of these areas will typically contain a number of results associated with that command.

Each area within memory 50 will be made available to statistics generator 51 which will perform a mathematical function dependent on the statistical information required i.e. max, min, mean, variance etc. The result is then stored in memory 52 together with identification indicative of each command analysed. Statistics are also generated for character echo times and stored with suitable identification in the memory 52. This can then all be made available via buffer 53 to the interface 9 for display at workstation 14.

The information display can be in the format shown below:

---

COMMAND: directory command
Total number of response measurements: 34.000
FIRST char response statistics
Min: 0.055
Max: 1.867

-continued

Mean: 0.262
Variance: 0.180
LAST char response statistics
Min: 0.110
Max: 18.939
Mean: 3.329
Variance: 26.130

| First response | Last response |
|---|---|
| 0.110 | 0.290 |
| 0.494 | 0.604 |
| 0.110 | 0.439 |
| 1.867 | 18.939 |
| 0.110 | 12.132 |
| 0.220 | 3.788 |
| 0.165 | 2.690 |
| 0.110 | 5.600 |
| 0.110 | 0.274 |
| 0.055 | 0.110 |
| 0.165 | 0.165 |
| 0.165 | 0.165 |
| 0.110 | 0.165 |
| 0.110 | 5.874 |
| 0.220 | 2.69 |
| 0.110 | 0.604 |
| 0.165 | 2.196 |

---

Such analysis allows statistics for different system configurations or load conditions to be provided. Thus the number of remote workstations can be varied or the tasks performed can be varied and the results evaluated.

Although the system has been described generally in terms of hardware blocks to achieve the configuration required, in practice it is possible to provide an arrangement which is based on a personal computer (PC) with suitable software to achieve the operations desired, provided suitable interfacing is available between the SYSTEM and the workstation.

Figure 7:
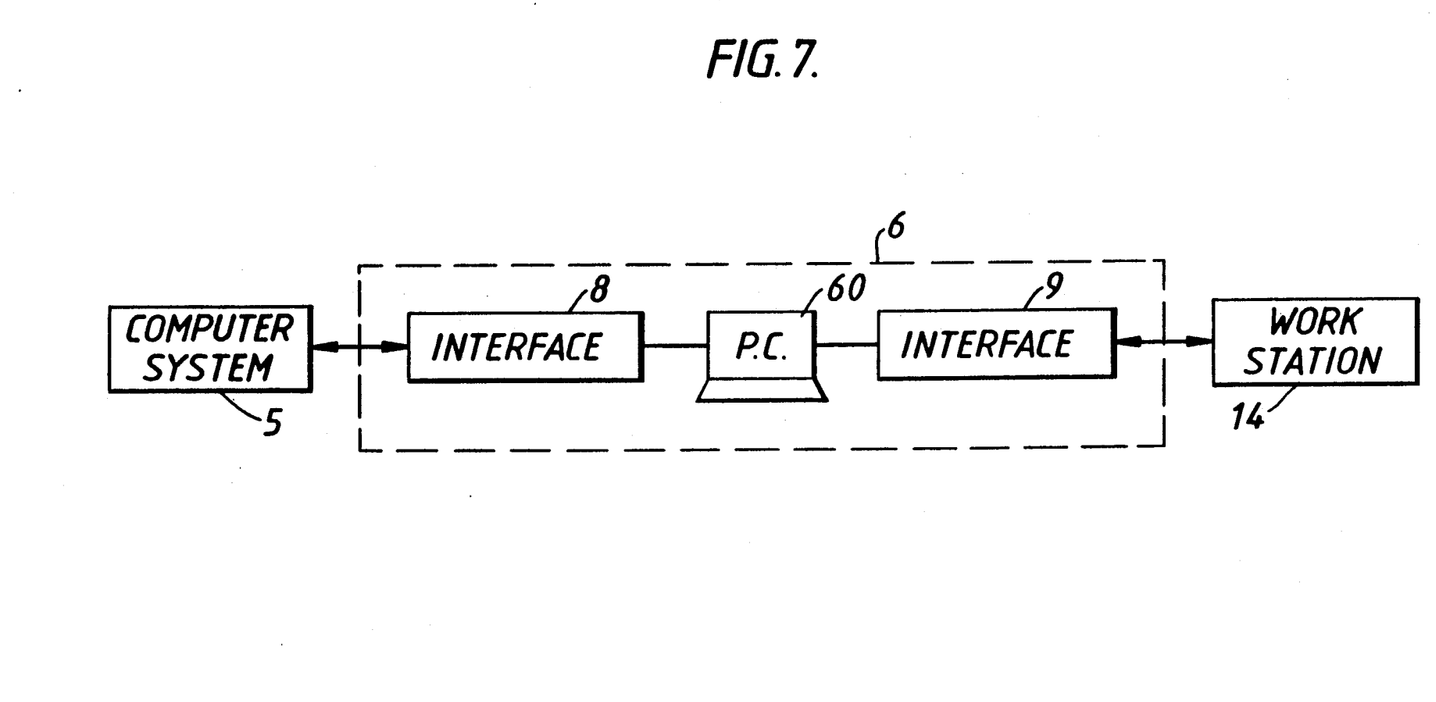
FIG. 7 shows an alternative embodiment employing a personal computer (PC)

Thus FIG. 7 shows the alternative embodiment which includes interfaces 8 and 9 associated with computer 60 (e.g. Merlin M5150). The computer memory is available for storage of information derived from the recording, processing, playback or analysing steps. In order for the recording operation to be obtainable the p.c. is operated to perform the function shown in FIG. 8.

Figure 8:
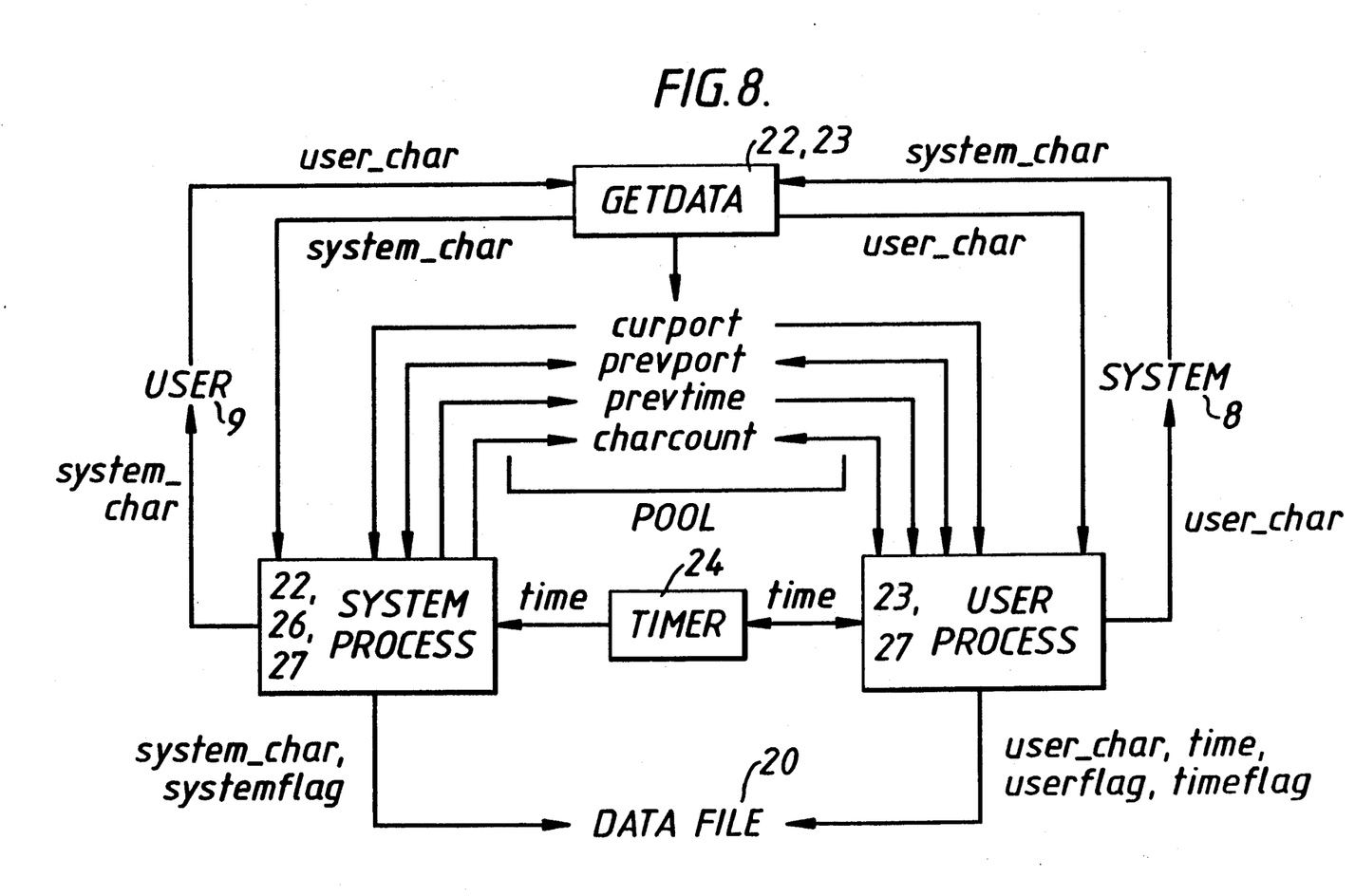
FIG. 8 shows the flow diagram associated with record

The reference numbers shown in FIG. 8 et seq, are equivalent to those shown in FIGS. 1 to 6 relating to the hardware based system.

In FIG. 8, the USER PROCESS deals with characters from the user port by timing the intervals between the characters and storing both characters and times sequentially in RAM. To achieve this, the TIMER must be reset, on receipt of a new character, after the current time has been recorded. The curport and prevport flags are used to decide whether to place a user flag. The charcount semaphore is used to decide whether a time flag and time should be placed after receiving a system response.

The SYSTEM PROCESS receives characters from the system port and stores them sequentially in RAM. The time delay between sending the last user character and receiving the current system character is stored in prevtime. The USER PROCESS Uses the charcount semaphore to decide whether this time delay should be stored. The curport and prevent flags are used to decide whether to place a system flag.

The arrows to and from the POOL of FIGS. 8 et seq indicate ASSIGNMENT and INTERROGATION of semaphore values. All other arrows indicate flow of data and are annotated with a data description. Named boxes indicate software processes.

Figure 9:
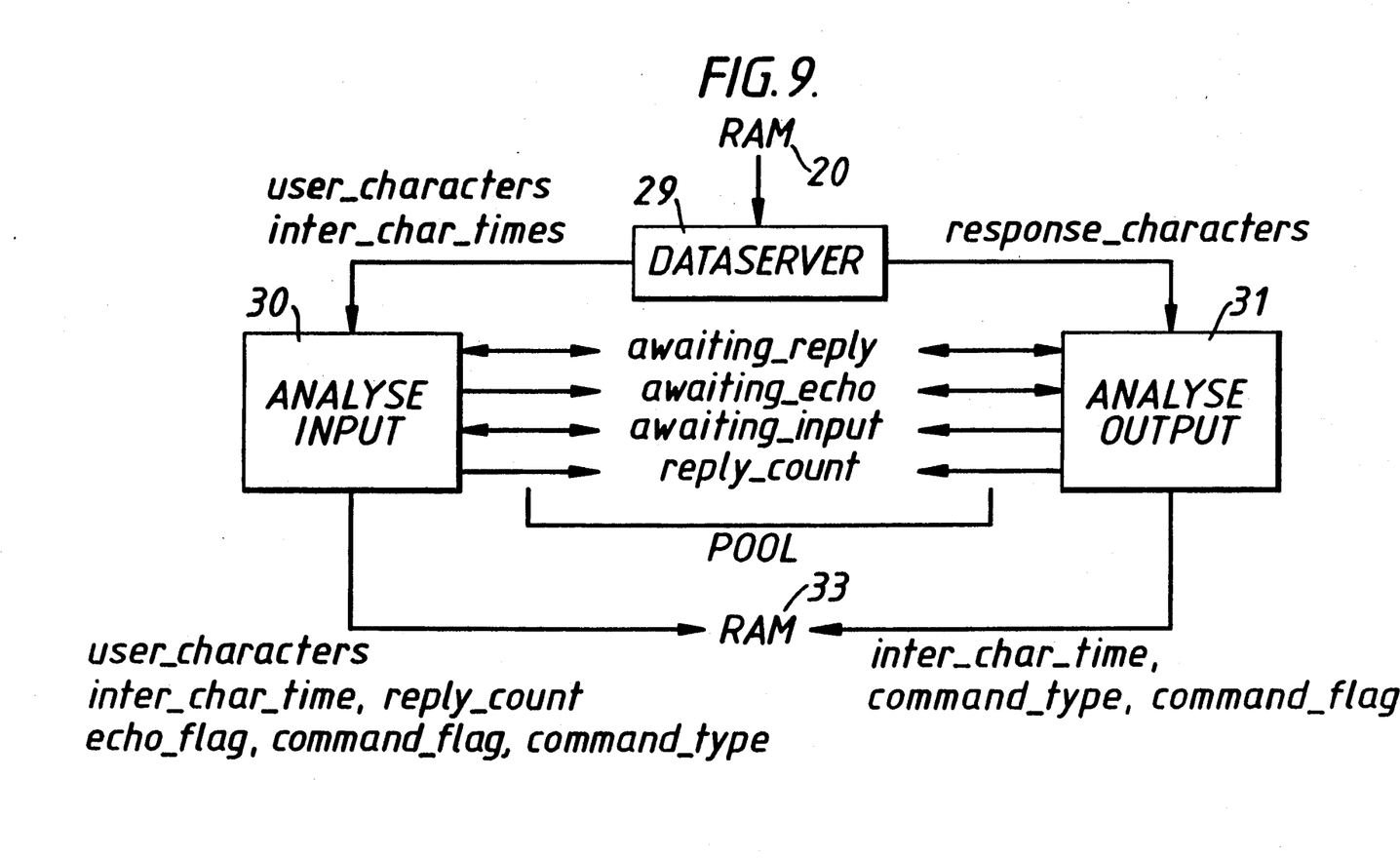
FIG. 9 shows the flow diagram associated with process.

In FIG. 9 associated with the Process sequence, the ANALYSE INPUT looks at the user character stream and identifies commands which have been previously defined by the user. This is possible by using a command identification tree which contains known command strings—this acts as a state/symbol table. Hence, commands can be identified in the context of the user operations. The character and inter_char_times are sent to RAM as command identification takes place. When a command is identified, a command flag and command type are stored.

The ANALYSE OUTPUT process deals with the system response characters. These characters may be echoed characters or command response characters.

The ANALYSE INPUT and ANALYSE OUTPUT can be seen in more detail as follows:

PROCESS: ANALYSE INPUT

Purpose: To analyse characters input by the user and take appropriate actions. Identifies COMMANDS and ECHOABLE CHARACTERS.

METHOD:
(i) if awaiting_reply from system and user inputs a char then display error.
  EXCEPTION: if terminal has sent consecutive XOFF, XON then store appropriate info.
(ii) if awaiting_input from user then store data collected by analyse output, awaiting_input=false.
(iii) store char and inter_char_time.
(i.e.) if char is echoable then increase awaiting_echo else store no_echo flag.
(v) if char is echoable then increase awaiting_echo semaphore else store no_echo flag.
(i.e.) if command detected then store type of command awaiting_reply=true.

PROCESS: ANALYSE OUTPUT

Purpose:
To analyse a char RESPONSE from the System (e.g. VAX) and take appropriate actions.
METHOD:
The actual value of the data has no meaning—the char is not analysed. The context in which the char appears is important and has the following effect:
(i) if char_echo expected from system then increase awaiting_echo (or echo_count) semaphore.
(ii) if awaiting_reply from system and no echoes expected then increase reply_count. If this is first char of reply then awaiting_reply=false. awiting_input=true.
(iii) if not awaiting_reply from system and no echoes expected then display warning, note exception and set up semaphores to handle it.

Figure 10:
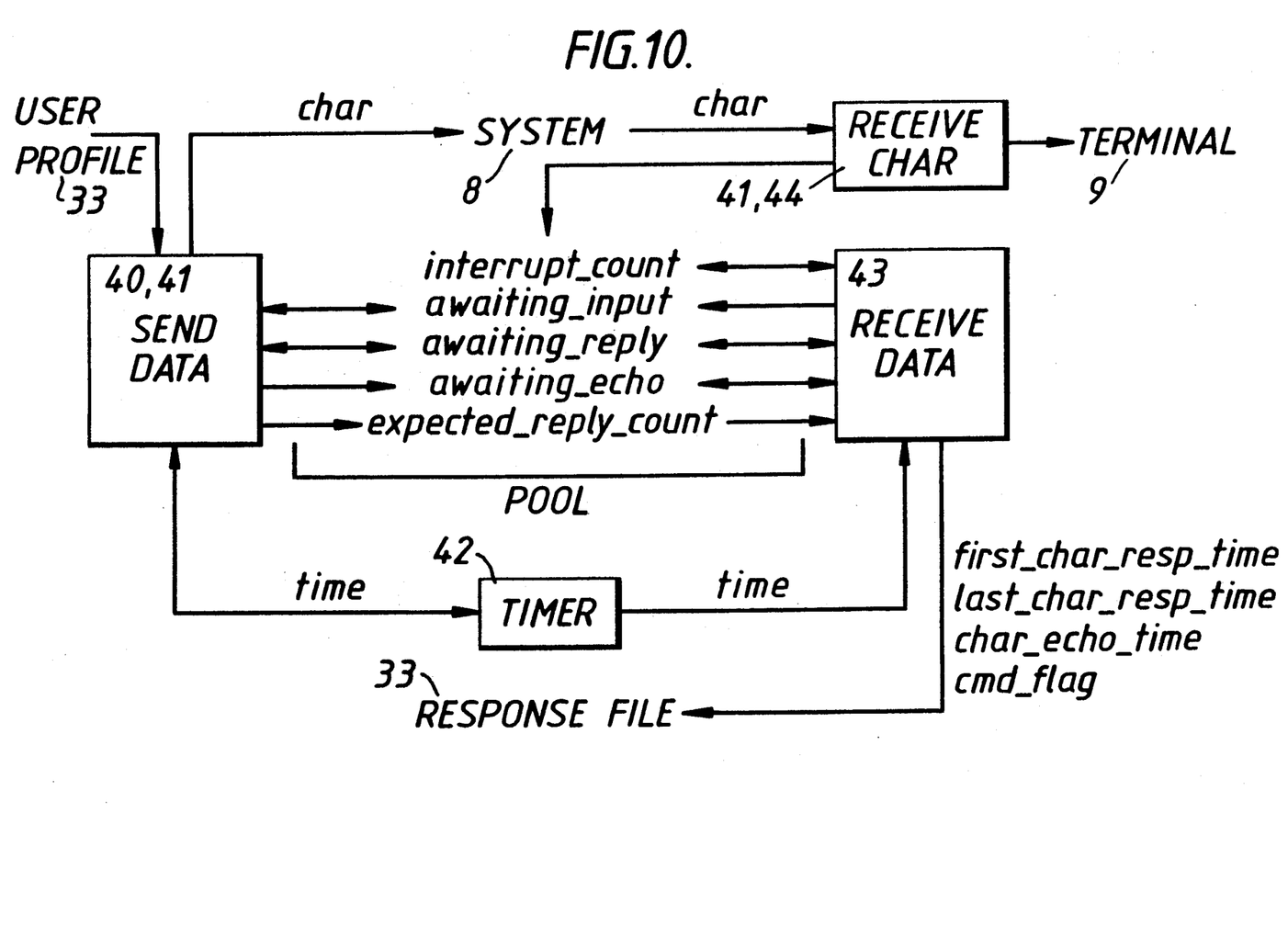
FIG. 10 shows the flow diagram associated with playback.

In FIG. 10 associated with playback, the SEND DATA process sends characters to the system at the appropriate time intervals, identifies when a command has been sent and detects echoable characters. The TIMER is controlled from this process.

The RECEIVED DATA processes data from the system via RECEIVE CHAR, records first and last character response times, detects character echoes and determines whether the number of response characters received was less-than, equal-to or greater-than expected. RECEIVE DATA only reads times from the timer.

RECEIVER CHAR is an interrupt routine which acts on characters received at the system port. It passes all characters to the terminal port for display.

Figure 11:
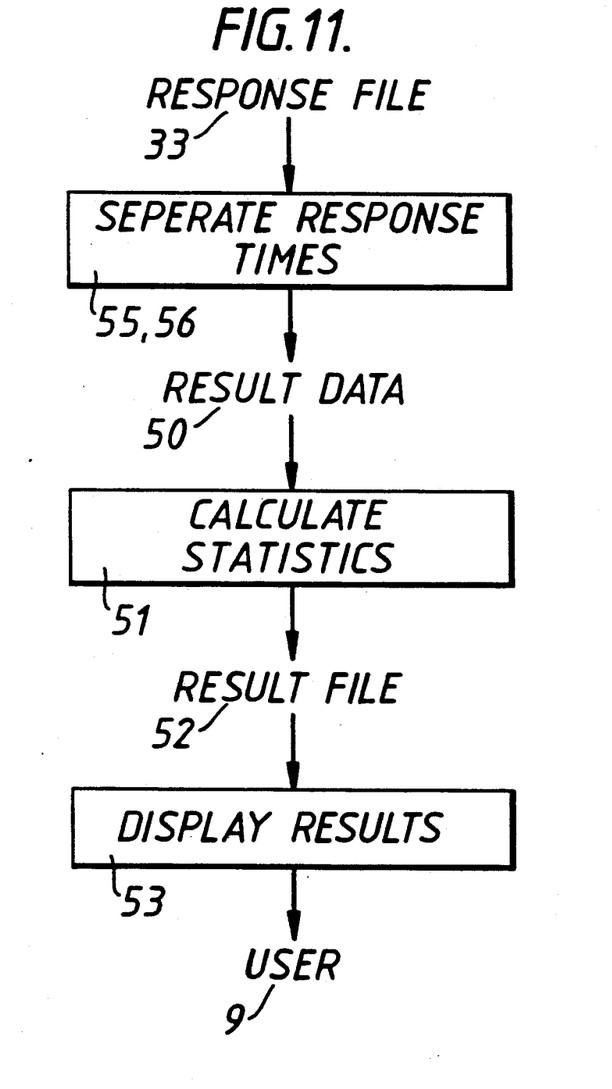
FIG. 11 shows the flow diagram associated with analysis.

In the Analysis stage, as shown in FIG. 11 the software operates as follows:

SEPARATE RESPONSE TIMES takes the information in the RESPONSE FILE and groups response time measurements which are related to a particular command type. Each possible command type is considered in turn and any related response times are stored in a particular memory area. All character echo times are also stored in a designated storage area.

The CALCULATE STATISTICS routine takes each group of response times and calculates varying statistical information i.e. min, max, mean, variance, etc. These statistical values are stored with suitable identification in a RESULT FILE. DISPLAY RESULTS outputs the statistical information gathered for each command, to the USER port, in a readable form.

We claim:
1. An evaluation system for connection to a computer to determine the computer performance in producing computer generated information in response to user generated information input to the computer from a remote workstation, said evaluation system comprising:
  means connectable to a computer for accessing user generated information and computer generated information;
  means for receiving accessed user generated information and computer generated information and including means for identifying predetermined specific information from that accessed indicative of a plurality of user generated commands and the computer generated responses associated therewith from the computer;
  means for receiving said specific information and for measuring time periods associated with user generation of the commands; and
  means responsive to said identifying means for measuring the times associated with the computer generated responses.

2. A system as claimed in claim 1 wherein:
  said means for accessing includes interface means connected between a computer and a workstation; and
  said means for identifying includes code generators for generating an origin code indicative of the identified predetermined specific information that is user generated or computer generated information.

3. A system as in claim 1 or 2 wherein said means for identifying includes detector means for determining information character length to distinquish between said commands, said responses and other information.

4. A system as in claim 1 including storage means for storing accessed user generated information and computer generated response information as well as timing and control information derived from the user generated and/or computer generated information.

5. A system as in claim 4 including means for processing the computer generated responses by counting the number of characters generated during each computer generated response and storing the result in said storage means.

6. A system as in claim 4 including means for processing the user generated information to identify the type of command information generated and determine whether an echo is expected for individual command characters identified, the results therefrom being available for storage in said storage means.

7. A system as in claim 6 including means for identifying user thinking times and/or intercharacter times from the user generated information.

8. A system as in claim 4 including means for reproducing at least some of said stored user generated information to effect operation of a connected computer and means for determining the computer response to such reproduced user generated information.

9. A system as in claim 8 wherein said reproducing means include means for passing stored user generated character information to the computer at a time relationship corresponding to that indicated by the stored time information, and means for detecting character counts and echos received from the computer in response to the user generated character information and timing information on these responses.

10. A system as in claim 8 including means for storing the computer generated response information together with original user generated information previously identified.

11. A system as in claim 10 including means for providing statistical information on a number of responses associated with specific user generated character echo times.

12. A system as in claim 11 wherein the means for providing includes means for sequentially accessing stored response information to determine the occurances of specific command types for accumulation in an identification analysis store.

13. A system as in claim 11 including output means for providing statistical information for display on a connected remote workstation.

14. A system as in claim 1 wherein the accessing means, identifying means and measuring means comprise an evaluation computer interfaced in series with a computer to be evaluated and with the workstation, said evaluation computer being configured to provide displayed information on the evaluation of the computer performance being evaluated.

15. A method for evaluating computer performance in response to user generated information produced from a remote workstation connected to interface with the computer being evaluated, said method comprising:
accessing user generated information from the remote workstation indicative of a plurality of commands and also accessing the computer generated responses associated therewith from the computer,
measuring time periods associated with generation of user generated commands, and
measuring time periods associated with computer generated responses.

16. A method as in claim 15 wherein the accessing step includes generating an origin code indicative of whether specific accessed information is user or computer generated.

17. A method as in claim 15 or 16 including detecting character lengths of the accessed information to distinguish between user generated commands, computer generated responses and other information.

18. A method as in claim 15 further including a step of storing accessed user generated information, and computer generated response information as well as timing and control information derived from said user generated and/or computer generated information.

19. A method as in claim 15 further including a step of counting the number of characters generated during each computer response and storing the result in a memory device.

20. A method as in claim 15 further including identifying a command string, if any, generated by the user to determine whether an echo is to be expected from the computer and storing information identifying same.

21. A method as in claim 20 including identifying user thinking times and/or intercharacter times from the user generated information.

22. A method as in claim 15 including the steps of storing and reproducing at least some of the accessed user generated information to effect operation of the computer and determining the computer generated responses thereto.

23. A method as in claim 22 wherein the reproducing step includes passing stored user generated character information to the computer at predetermined time intervals and detecting in responsive computer generated information character counts and echos.

24. A method as in claim 23 including storing the computer generated response information together with original user generated command information previously stored.

25. A method as in claim 22 including the step of generating statistical information on a number of computer generated responses associated with specific user generated commands and/or with computer generated character echo times.

26. A method as in claim 25 further including a step of sequentially accessing stored computer generated response information to determine occurrances of specific command types for accumulation in an identification analysis store.

27. A method as in claim 25 including providing analysed information for display on the remote workstation.

28. An evaluation system for computer performance including:
means for accessing user and computer generated information;
means for storing said accessed information including elapsed times associated with the generation of said accessed information;
means for distinguishing between types of information accessed so as to identify user generated information and computer generated information; and
means for reproducing at least some of said stored user information to effect operation of a connected computer to allow determination of responses from the connected computer to said reproduced information.

29. A method for evaluating computer performance including:
accessing user and computer generated information;
storing at least some of said accessed information including elapsed times associated with its generation;
distinguishing between types of information accessed so as to identify user generated information and computer generated information; and
reproducing at least some of said stored user information to effect operation of a connected computer to allow determination of responses from the connected computer to said reproduced information.

* * * * *